United States Patent
Feng et al.

(10) Patent No.: US 7,990,118 B2
(45) Date of Patent: Aug. 2, 2011

(54) SWITCHING REGULATOR WITH HIGH EFFICIENCY IN LIGHT LOAD MODE

(75) Inventors: Wei-Wen Feng, Hsinchu (TW); Wen-Yen Lee, Hsinchu (TW)

(73) Assignee: Fitipower Integrated Technology, Inc., Miaoli County (TW)

( * ) Notice: Subject to any disclaimer, the term of this patent is extended or adjusted under 35 U.S.C. 154(b) by 487 days.

(21) Appl. No.: 12/192,028

(22) Filed: Aug. 14, 2008

(65) Prior Publication Data

US 2009/0045791 A1    Feb. 19, 2009

(30) Foreign Application Priority Data

Aug. 16, 2007    (CN) .......................... 2007 1 0143971

(51) Int. Cl.
*G05F 1/59*    (2006.01)
(52) U.S. Cl. ...................................... 323/271; 323/286
(58) Field of Classification Search .................. 323/271, 323/282, 285, 286
See application file for complete search history.

(56) References Cited

U.S. PATENT DOCUMENTS

| | | | | |
|---|---|---|---|---|
| 7,245,113 | B2 * | 7/2007 | Chen et al. | 323/271 |
| 7,492,135 | B2 * | 2/2009 | Saeki et al. | 323/271 |
| 7,755,342 | B2 * | 7/2010 | Chen et al. | 323/283 |
| 7,843,179 | B2 * | 11/2010 | Hasegawa et al. | 323/271 |
| 2007/0216372 | A1 | 9/2007 | Weng et al. | |
| 2008/0088283 | A1 * | 4/2008 | Ruobiao et al. | 323/271 |
| 2009/0045791 | A1 * | 2/2009 | Feng et al. | 323/282 |
| 2010/0072968 | A1 * | 3/2010 | Bianco et al. | 323/284 |
| 2010/0201336 | A1 * | 8/2010 | Chen et al. | 323/285 |
| 2010/0237841 | A1 * | 9/2010 | Matsuo et al. | 323/282 |
| 2010/0283442 | A1 * | 11/2010 | Nakashima | 323/283 |

* cited by examiner

*Primary Examiner* — Jeffrey L Sterrett
(74) *Attorney, Agent, or Firm* — Andrew C. Cheng

(57) ABSTRACT

An exemplary switching regulator, is provided. The switching regulator includes an oscillator, a PWM logic controller, an inductor, a capacitor, a switch, a driver, a current sense amplifier, and a minimum power pulse width generator. The current sense amplifier and the minimum power pulse width generator compose a first feedback loop for generating a first feedback signal to the PWM logic controller.

7 Claims, 1 Drawing Sheet

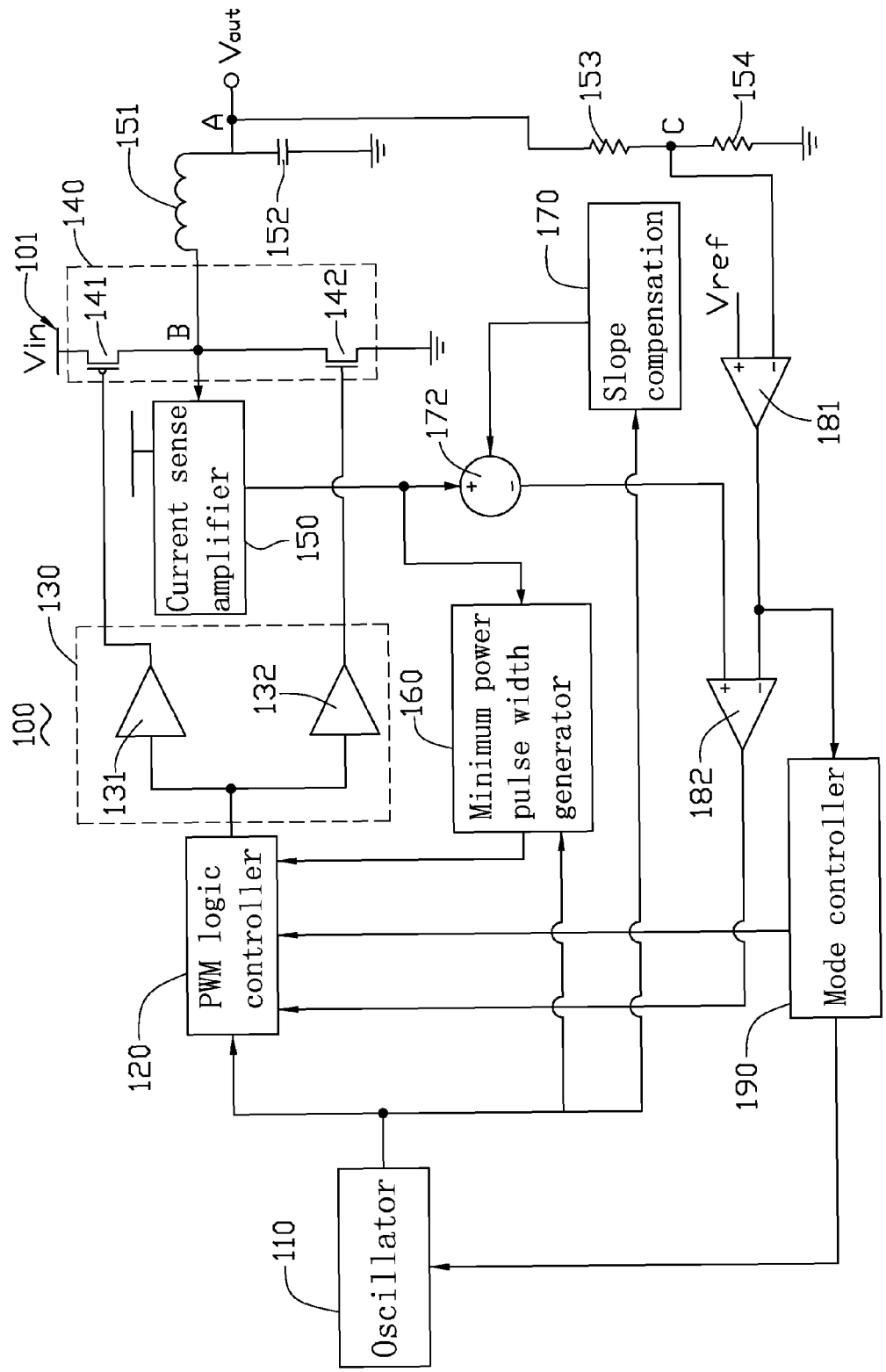

SWITCHING REGULATOR WITH HIGH EFFICIENCY IN LIGHT LOAD MODE

CROSS-REFERENCE TO RELATED APPLICATIONS

This application claims all benefits accruing under 35 U.S.C. §119 from China Patent Application No. 200710143971.1, filed on Aug. 16, 2007 in the China Intellectual Property Office, the disclosure of which is incorporated herein by reference.

BACKGROUND

1. Technical Field

The present invention generally relates to regulators and, particularly, to a switching regulator.

2. Description of Related Art

With the rapid developments of science and technology, portable electronic devices, such as notebook computer, personal digital assistant (PDA), mobile phone, global positioning system (GPS) and multimedia player, are ubiquitous.

One highly desirable feature of these portable electronic devices is a lengthy standby time. The standby time directly relates to the performance measurements of the portable electronic devices. The standby time of portable electronic devices is determined, to some degree, by the efficiency of the switching regulators of the portable electronic devices. If the switching regulators have a high efficiency, particularly in the light load mode, the portable electronic devices may have a long standby time.

Conventional switching regulators have a very low switching efficiency in the light load mode, therefore, the standby time of the corresponding portable electronic devices is low.

Therefore, what is needed is a switching regulator, which has a high switching efficiency in the light load mode.

SUMMARY

A switching regulator, in accordance with a present embodiment, is provided. The switching regulator includes an oscillator, a PWM logic controller, an inductor, a capacitor, a power supply a switch, a driver, a current sense amplifier, and a minimum power pulse width generator. The oscillator is configured for generating a wave having a constant frequency. The PWM logic controller electrically connects to the oscillator for generating a first control voltage. The inductor and the capacitor compose an LC filter and a first node is defined between the inductor and the capacitor. The first node is used as an output terminal of the switching regulator for outputting an output voltage. The driver interconnects the PWM logic controller with the switch. The current sense amplifier electrically connects to the switch and the inductor for sensing a current passing through the inductor. The minimum power pulse width generator interconnects the current sense amplifier with the PWM logic controller and is configured for generating a first feedback signal to the PWM logic controller such that the PWM logic controller generates a second control voltage according to the first feedback signal.

Other advantages and novel features will become more apparent from the following detailed description of embodiments, when taken in conjunction with the accompanying drawings.

BRIEF DESCRIPTION OF THE DRAWINGS

Many aspects of the present switching regulator can be better understood with reference to the following drawing. The components in the drawing are not necessarily drawn to scale, the emphasis instead being placed upon clearly illustrating the principles of the present switching regulator. Moreover, in the drawing, like reference numerals designate corresponding parts throughout the several views.

The drawing is a schematic, circuit diagram of a switching regulator, in accordance with a preferred embodiment.

The exemplifications set out herein illustrate various preferred embodiments, in various forms, and such exemplifications are not to be construed as limiting the scope of the present switching regulator in any manner.

DETAILED DESCRIPTION

Reference will now be made to the drawing to describe, in detail, at least one preferred embodiment of the present switching regulator.

Referring to the drawing, a switching regulator 100, in accordance with a present embodiment, is provided. The switching regulator 100 includes an oscillator 110, a PWM (pulse-width-modulating) logic controller 120, a driver 130, a switch 140, a current sense amplifier 150, a minimum power pulse width generator 160, an inductor 151 and a capacitor 152.

The oscillator 110 is configured for generating a square wave having a constant frequency. The PWM logic controller 120 is configured for generating a control voltage. In this exemplary embodiment, the oscillator 110 has an output terminal and an input terminal. The PWM logic controller 120 has a first input terminal, a second input terminal, a third input terminal, a fourth input terminal, and an output terminal. The output terminal of the PWM logic controller 120 is configured for outputting the control voltage, and the control voltage is generated according to signals sent from the first input terminal, the second input terminal, the third input terminal and the fourth input terminal thereof. The first input terminal of the PWM logic controller 120 electrically connects to the output terminal of the oscillator 110 for receiving the wave.

The driver 130 electrically interconnects the PWM logic controller 120 with the switch 140 and is configured for transmitting the control voltage generated from the PWM logic controller 120 to the switch 140 for controlling the on/off state of the switch 140. The switch 140 is configured for interconnecting the inductor 151 with a power supply 101, such that when the switch 140 is turned on, the power supply 101 is connected to the inductor 151 for supplying power to the inductor 151; and when the switch 140 is turned off, the power supply 101 is disconnected from the inductor 151 and no power is supplied to the inductor 151. The power supply 101 may be a battery of a portable electronic device, for supply an input voltage Vin.

In this exemplary embodiment, the driver 130 includes a first buffer 131 and a second buffer 132, and the switch 140 includes a first transistor 141 and a second transistor 142. Each buffer 131, 132 has an input terminal and an output terminal; and each transistor 141, 142 has a source terminal, a drain terminal and a gate terminal. The input terminal of the first buffer 131 is connected to the output terminal of the PWM logic controller 120 for receiving the control voltage. The output terminal of the first buffer 131 is connected to the gate terminal of the first transistor 141 for transmitting the control voltage to the first transistor 141 and turning on or off the first transistor 141. The input terminal of the second buffer 132 is connected to the output terminal of the PWM logic controller 120 for receiving the control voltage, and the output terminal of the second buffer 132 is connected to the gate terminal of the second transistor 142 for transmitting the control voltage to the second transistor 142 and thereby turning on or off the second transistor 142.

The source terminal of the first transistor 141 is connected to the power supply 101, the drain terminal of the first transistor 141 is connected to the source terminal of the second transistor 142. The drain terminal of the second transistor 142 is connected to the ground. A second node B is defined between the drain terminal of the first transistor 141 and the source terminal of the second transistor 142. The inductor 151 is connected to the second node B. The first transistor 141 and the second transistor 142 are of opposite types. In this exemplary embodiment, the first transistor 141 is a p-MOS transistor and the second transistor 142 is an n-MOS transistor.

The inductor 151 and the capacitor 152 forms an LC filter and a first node A is defined between the inductor 151 and the capacitor 152. More concretely, the inductor 151 has a first terminal and a second terminal, and the capacitor 152 has a first terminal and a second terminal. In this exemplary embodiment, the first terminal of the inductor 151 is connected to the second node B, and the second terminal of the inductor 151 is connected to the first terminal of the capacitor 152. The second terminal of the capacitor 152 is connected to the ground. The first node A is used as the output terminal of the switch regulator 100 for outputting an output voltage Vout.

The current sense amplifier 150 is electrically connected to the inductor 151 for sensing a current passing through the inductor 151, and then generating a sensing signal. More concretely, the current sense amplifier 150 has an input terminal and an output terminal, and the input terminal thereof is connected to the second node B for sensing the current through the inductor 151.

The minimum power pulse width generator 160 is interconnected to the current sense amplifier 150 with the PWM logic controller 120. The minimum power pulse width generator 160 and the current sense amplifier 150 compose a first feedback loop for generating a first feedback signal to the PWM logic controller 120. More concretely, the minimum power pulse width generator 160 includes a first input terminal, a second input terminal and an output terminal. The output terminal of the current sense amplifier 150 is connected to the first terminal of the minimum power pulse width generator 160. The second input terminal of the minimum power pulse width generator 160 is connected to the output terminal of the oscillator 110. The output terminal of the minimum power pulse width generator 160 is connected to the second terminal of the PWM logic controller 120.

Preferably, the present switching regulator 100 may further includes a first resistor 153, a second resistor 154, an error amplifier 181 and a comparator 182. The first resistor 153, the second resistor 154, the error amplifier 181 and the comparator 182 are arranged between the first node A and the PWM logic controller 120, so as to form a second feedback loop for generating a second feedback to the PWM logic controller 120. More concretely, the first resistor 153 and the second resistor 154, respectively have a first terminal and a second terminal. The error amplifier 181 and the comparator 182, respectively have an inverting input terminal, a noninverting input terminal and an output terminal. The first terminal of the first resistor 153 electrically connects to the first node A. The second terminal of the first resistor 153 electrically connects to the first terminal of the second resistor 154, and a third node C is defined therebetween. The second terminal of the second resistor 154 electrically connects to the ground. The noninverting input terminal of the error amplifier 181 electrically connects to a reference voltage, and the inverting input terminal thereof electrically connects to the third node C. The output terminal of the error amplifier 181 electrically connects to the inverting input terminal of the comparator 182. The noninverting input terminal of the comparator 182 electrically connects to the output terminal of the current sense amplifier 150. The output terminal of the comparator 182 electrically connects to the third input terminal of the PWM logic controller 120.

The present switching regulator 100 further includes a mode controller 190 configured for making the switch regulator 100 operate by using the first feedback loop or by using the second feedback loop. The mode controller 190 has an input terminal, a first output terminal and a second output terminal. The input terminal of the mode controller 190 electrically connects to the inverting terminal of the comparator 182, the first output terminal thereof electrically connects to the input terminal of the oscillator 110, and the second output terminal thereof electrically connects to the fourth terminal of the PWM logic controller 120.

Preferably, the present switching regulator 100 may further include an adder 172 and a slope compensator 170. The adder 172 has a first input terminal, a second input terminal and an output terminal. The slope compensator 170 includes an input terminal and an output terminal. The adder 172 is arranged between the current sense amplifier 150 and the comparator 182. The first input terminal of the adder 172 electrically connects to the output terminal of the current sense amplifier 150, the second input terminal thereof electrically connects to the output terminal of the slope compensator 170, and the output terminal thereof electrically connects to the noninverting input terminal of the comparator 182. The input terminal of the slop compensator 170 electrically connects to the output terminal of the oscillator 110.

The current sense amplifier 150 is connected to the second node B for sensing a current passing through the inductor 151 to detect whether enough power is stored in the LC filter in the light load mode. The current sense amplifier 150 and the minimum power pulse width generator 160 compose the first feedback loop. The first resistor 153, the second resistor 154, the error amplifier 181 and the comparator 182 compose the second feedback loop. If there is not enough power stored in the LC filter to maintain the output voltage Vout, the first feedback loop and the second feedback loop respectively operate to increase the power of the LC filter. The mode controller 190 is configured for determining whether to use the first feedback loop or the second feedback loop to increase the power of the LC filter. The power of the LC filter is increased by turning on the transistor 141.

More concretely, if there is not enough power stored in the LC filter, the voltage of the third node C drops, and an output signal that represented the needed power level of the Vout can be outputted from the output terminal of the error amplifier 181 to the inverting input terminal of the comparator 182. And the first transistor 141 is turned on to charge the inductor 151 at the high level of the square wave from the oscillator 110, at the same time the current sense amplifier 150 is detecting the outputted current. The outputted current added the current from the slop compensator 170 transfers to the noninverting input terminal of the comparator 182. The comparator 182 generates a signal to the PWM logic controller 120 after comparing the signals loading on the inverting input terminal and the noninverting input terminal thereof, so as to turn off the first transistor 141 and turn on the second transistor 142. Such that, the power supply 101 is connected to the inductor 151 of the LC filter to charge the inductor 151 and the capacitor 152 to increase the preferred minimum power to the LC filter. After charging the inductor 151 and the capacitor 152 to the preferred minimum power, the first transistor 141 is turned off. The pulse width of the PWM logic controller 120 is determined by loops of the switching regulator 100.

Compared with conventional switching regulator, the present switching regulator 100 employs the minimum power pulse width generator 160 to compensate for the minimum preferred pulse to the LC filter composed of the inductor 151 and the capacitor 152, in this case the outputted power is larger than the needed regulation power. The present switching regulator 100 would stand into Power saving mode after generated the minimum power pulse, and generating the minimum power pulse once again until the outputted power Vout is not enough. Therefore, the present switching regulator 100 would stand into Power saving mode in the period between the two successive minimum power pulses, so the present switching regulator 100 has a high switching efficiency in the light load mode, and the electronic device employing the present switching regulator 100, has a long standby time.

Furthermore, when a work cycle duty of the switching regulator 100 is larger than 50%, the switching regulator 100 is prone to be in an unsteady condition, and the average current of the inductor 151 is prone to generate secondary harmonic generation. The present switching regulator 100 further includes the slop compensator 170, which can correct this problem.

It is believed that the present embodiments and their advantages will be understood from the foregoing description and it will be apparent that various changes may be made thereto without departing from the spirit and scope of the invention or sacrificing all of its material advantages, the examples hereinbefore described merely being preferred or exemplary embodiments of the present invention.

What is claimed is:

1. A switching regulator, comprising:
    an oscillator having an output terminal, the oscillator being configured for generating a wave having a constant frequency;
    a PWM logic controller having a first input terminal, a second input terminal and an output terminal, the first input terminal of the PWM logic controller electrically connecting to the output terminal of the oscillator, the PWM logic controller generating a first control voltage according to the wave generated from the oscillator;
    an inductor;
    a capacitor electrically connected to the inductor, the inductor and the capacitor composing an LC filter, a first node being defined therebetween, and the first node being used as an output terminal of the switching regulator for outputting an output voltage;
    a driver;
    a switch interconnecting the inductor with a power supply, the driver interconnecting the output terminal of the PWM logic controller with the switch;
    a current sense amplifier having an input terminal and an output terminal, the input terminal of the current sense amplifier electrically connecting to the inductor and configured for sensing a current passing through the switch and the inductor; and
    a minimum power pulse width generator having a first input terminal, a second input terminal and an output terminal, the first input terminal thereof electrically connecting to the output terminal of the current sense amplifier, the second input terminal thereof electrically connecting to the output terminal of the oscillator, the output terminal thereof electrically connecting to the second input terminal of the PWM logic controller, the current sense amplifier and the minimum power pulse width generator composing a first feedback loop for generating a first feedback signal to the PWM logic controller such that the PWM logic controller generates a second control voltage according to the first feedback signal.

2. The switching regulator as claimed in claim 1, wherein the driver includes a first buffer and a second buffer, and the switch includes a first transistor and a second transistor, the first buffer and the second buffer respectively include an input terminal and an output terminal, the first transistor and the second transistor respectively include a source terminal, a drain terminal and a gate terminal, the input terminals of the first buffer and the second buffer respectively electrically connect to the output terminal of the output terminal of the PWM logic controller, the output terminal of the first buffer electrically connects to the gate terminal of the first transistor, the output terminal of the second buffer electrically connects to the gate terminal of the second transistor, the source terminal of the first transistor electrically connects to the power supply, the drain terminal of the first transistor electrically connects to the source terminal of the second transistor, the drain terminal of the second transistor electrically connects to the ground, a second node is defined between the drain terminal of the first transistor and the source terminal of the second transistor, and the inductor electrically connects to the second node.

3. The switching regulator as claimed in claim 2, wherein the first transistor is a p-MOS transistor, and the second transistor is an n-MOS transistor.

4. The switching regulator as claimed in claim 1, wherein the PWM logic controller further includes a third input terminal, and the switching regulator further comprise:
    a first resistor having a first terminal and a second terminal, the first terminal thereof electrically connecting to the first node;
    a second resistor having a first terminal and a second terminal, the first terminal thereof electrically connecting to the second terminal of the first resistor, a third node being defined therebetween, and the second terminal of the second resistor electrically connecting to the ground;
    an error amplifier having an inverting input terminal, a noninverting input terminal and an output terminal, the noninverting input terminal thereof electrically connecting to a reference voltage, and the inverting input terminal thereof electrically connecting to the third node; and
    a comparator having an inverting input terminal, a noninverting input terminal and an output terminal, the inverting input terminal thereof electrically connecting to the output terminal of the error amplifier, the noninverting input terminal thereof electrically connecting to the output terminal of the current sense amplifier, the output terminal thereof electrically connecting to the third input terminal of the PWM logic controller, the first resistor, the second resistor, the error amplifier, the comparator composing a second feedback loop for generating a second feedback signal to the PWM logic controller, such that the PWM logic controller generates a third control voltage according to the second feedback signal.

5. The switching regulator as claimed in claim 4, wherein the PWM logic controller further includes a fourth input terminal, the oscillator further includes an input terminal, and the switching regulator further comprises:
    a mode controller having an input terminal, a first output terminal and a second output terminal, the input terminal thereof electrically connecting to the inverting terminal of the comparator, the first output terminal thereof electrically connecting to the input terminal of the oscillator, and the second output terminal thereof electrically connecting to the fourth terminal of the PWM logic controller.

6. The switching regulator as claimed in claim 4, further comprising:
an adder having a first input terminal, a second input terminal, and an output terminal, the first input terminal thereof electrically connecting to the output terminal of the current sense amplifier, and the output terminal thereof electrically connecting to the noninverting terminal of the comparator;
a slope compensator having an input terminal and an output terminal, the input terminal thereof electrically connecting to the output terminal of the oscillator, and the output terminal thereof electrically connecting to the second input terminal of the adder.

7. The switching regulator as claimed in claim 1, wherein the power supply is a battery.

* * * * *